United States Patent
Paiva et al.

(10) Patent No.: US 10,974,562 B2
(45) Date of Patent: Apr. 13, 2021

(54) METHODS AND APPARATUS TO ADJUST VEHICLE SUSPENSION DAMPING

(71) Applicant: Ford Global Technologies, LLC, Dearborn, MI (US)

(72) Inventors: Chris Paiva, Novi, MI (US); Tom Sawarynski, West Bloomfield, MI (US); Steven Thompson, Royal Oak, MI (US); Daniel Collins, Grass Lake, MI (US); Geoffrey Bossio, Beverly Hills, MI (US); Jason Wallace Michener, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 82 days.

(21) Appl. No.: 16/104,654

(22) Filed: Aug. 17, 2018

(65) Prior Publication Data

US 2020/0055363 A1 Feb. 20, 2020

(51) Int. Cl.
*B60G 17/0165* (2006.01)
*B60G 17/018* (2006.01)
*B60G 17/019* (2006.01)
*B60G 17/06* (2006.01)

(52) U.S. Cl.
CPC ..... *B60G 17/0165* (2013.01); *B60G 17/0182* (2013.01); *B60G 17/01933* (2013.01); *B60G 17/06* (2013.01); *B60G 2400/204* (2013.01); *B60G 2400/821* (2013.01); *B60G 2400/954* (2013.01); *B60G 2500/10* (2013.01)

(58) Field of Classification Search
CPC .... B60G 17/00; B60G 17/015; B60G 17/016; B60G 17/01933; B60G 17/06; B60G 2400/20; B60G 2400/204; B60G 2400/25; B60G 2400/252; B60G 2400/33; B60G 2400/34

See application file for complete search history.

(56) References Cited

U.S. PATENT DOCUMENTS

| | | | |
|---|---|---|---|
| 4,600,215 A * | 7/1986 | Kuroki | B60G 17/0165 180/169 |
| 9,533,539 B2 | 1/2017 | Eng et al. | |
| 2014/0125018 A1 * | 5/2014 | Brady | B60G 17/016 280/5.519 |
| 2014/0303844 A1 | 10/2014 | Hoffmann et al. | |
| 2014/0316637 A1 * | 10/2014 | Rhode | B60G 17/02 701/29.1 |

(Continued)

FOREIGN PATENT DOCUMENTS

| | | |
|---|---|---|
| CN | 103303088 | 11/2015 |
| JP | 2011152838 | 8/2011 |

*Primary Examiner* — Anshul Sood
(74) *Attorney, Agent, or Firm* — Ray Coppiellie; Hanley, Flight & Zimmerman, LLC

(57) ABSTRACT

Methods and apparatus to adjust vehicle suspension damping are disclosed herein. An example apparatus includes a sensor interface to obtain wheel position information and vehicle speed information from sensors associated with wheels of a vehicle and obtain throttle position information. The apparatus further includes a parameter analyzer to determine a compression damping command based on the wheel position information, the vehicle speed information, and the throttle position information and an instruction generator to adjust a damping system of the vehicle based on the compression damping command.

20 Claims, 6 Drawing Sheets

(56) References Cited

U.S. PATENT DOCUMENTS

| | | | |
|---|---|---|---|
| 2015/0057885 A1* | 2/2015 | Brady | B60G 17/06 |
| | | | 701/38 |
| 2016/0107498 A1* | 4/2016 | Yamazaki | B60G 17/016 |
| | | | 701/37 |
| 2016/0272032 A1* | 9/2016 | Nedachi | B60G 17/01908 |
| 2016/0272033 A1* | 9/2016 | Nedachi | B60G 17/0164 |
| 2016/0272034 A1* | 9/2016 | Nedachi | B60G 17/0164 |
| 2017/0106855 A1 | 4/2017 | Lavoie et al. | |
| 2017/0361672 A1* | 12/2017 | Ahmadian | B60G 11/27 |
| 2018/0354336 A1* | 12/2018 | Oakden-Graus | B60G 17/08 |
| 2019/0001777 A1* | 1/2019 | Kral | B60G 17/016 |

* cited by examiner

METHODS AND APPARATUS TO ADJUST VEHICLE SUSPENSION DAMPING

FIELD OF THE DISCLOSURE

This disclosure relates generally to vehicle suspensions and, more particularly, to methods and apparatus to adjust vehicle suspension damping.

BACKGROUND

Compression damping in suspension systems aids the suspension in absorbing bumps or road irregularities as a wheel of a vehicle moves upward (e.g., using a shock absorber). Higher compression damping provides higher resistance to upward movement of the wheel of the vehicle. When the vehicle is traveling on rough terrain (e.g., off-road terrain, surfaces with large bumps or obstacles, etc.), higher levels of compression damping absorb the obstacles more effectively. On the other hand, when the vehicle travels on smooth terrain (e.g., a road, a flat driving surface, etc.), less compression damping is desired to provide a smooth ride for a driver of the vehicle.

Figure 1:
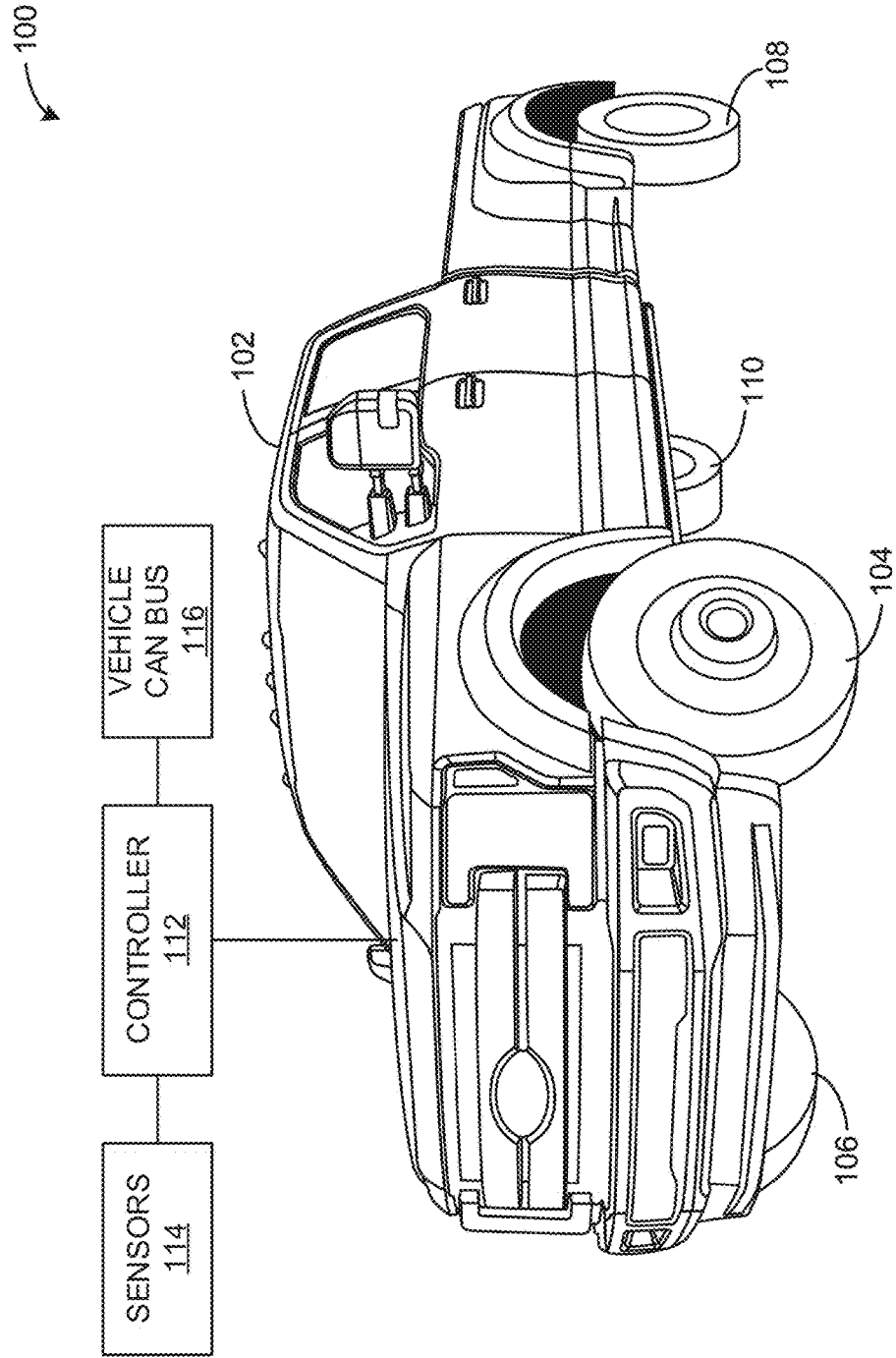
FIG. 1 represents an example environment 100 in which the apparatus and methods disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Compression damping (e.g., jounce damping) assists a suspension in absorbing large obstacles and impacts when driving a vehicle on rough terrain (e.g., off-road terrain). In some vehicles, suspensions implementing shock absorbers with high levels of compression damping to allow the vehicle to travel at higher speeds over such terrain. However, the high levels of compression damping in these shock absorbers are accompanied by drawbacks when driving on other surfaces. For example, driving on a smooth surface with these high levels of compression damping makes for a rough and/or stiff ride, reducing driver comfort and handling. The harsh driving conditions are exacerbated as the vehicle speed increases. In some other examples, shock absorbers are manually adjusted to change (e.g., increase or decrease) the level of compression damping. However, these shock absorbers require substantial knowledge of shock absorber tuning, and, further, the driver must stop the vehicle to manually adjust each of the shock absorbers whenever a change in compression damping is desired. Therefore, it is desirable for the compression damping associated with a shock absorber to be adjustable based on driving conditions, such as terrain and vehicle speed. Further, it is desirable for compression damping adjustments to occur without a need for the driver to manually make the adjustments.

The examples disclosed herein adjust suspension damping (e.g., compression damping) based on numerous parameters, such as driving conditions (e.g., vehicle speed, throttle position, etc.), vehicle characteristics, and trends in terrain conditions. The methods and apparatus disclosed herein adjust the amount of damping needed to provide comfort to the driver of the vehicle, prevent vehicle damage, and provide control to the driver on rough terrain (e.g., off-road driving). The examples disclosed herein determine the terrain conditions based on wheel position of a wheel or wheels of the vehicle and adjust the damping according to these terrain conditions and the speed of the vehicle. The examples disclosed herein adjust compression damping of the suspension. Additionally or alternatively, the examples disclosed herein further make adjustments to rebound damping of the suspension. Further, the examples disclosed herein advantageously use throttle position to adjust the level of damping, effectively anticipating the actions of the driver (e.g., changes in throttle position indicate intent of the driver to increase or decrease vehicle speed). For example, given a change in vehicle speed, terrain conditions, and/or throttle position, the examples disclosed herein can make adjustments to the compression damping of the suspension, the rebound damping of the suspension, and/or both the compression damping and the rebound damping. These adjustments to the damping of the suspension give the driver of the vehicle extensive control regardless of terrain and provide a smooth, comfortable ride on all types of driving surfaces.

FIG. 1 represents an example environment 100 in which the apparatus and methods disclosed herein may be implemented. The example environment 100 includes an example vehicle 102. The vehicle 102 of the illustrated example is a truck. In some examples, the vehicle 102 is a car (e.g., a sedan), motorcycle, and/or any other vehicle having a suspension system. The vehicle 102 may be a body-on-frame construction or unibody construction.

The vehicle 102 of the illustrated example includes front wheels 104, 106 supported by a front suspension and rear wheels 108, 110 supported by a rear suspension. The front suspension associated with the front wheels 104, 106 provides steerability to the front wheels 104, 106. Likewise, the rear suspension associated with the rear wheels 108, 110 provides steerability to the rear wheels 108, 110. The example teachings of this disclosure may be implemented with any type of suspension (e.g., a steerable suspension, a non-steerable suspension) and/or any other types of vehicles. In examples disclosed herein, increasing current input to the suspension (e.g., to a damper, shock absorber, etc.) decreases the amount of compression damping. On the other hand, a decrease in input current leads to an increase in compression damping. However, examples disclosed herein can also be implemented in environments wherein compression damping increases when input current increases. For example, the changes to the current disclosed herein could be reversed given a reverse in the effect of changes to the input current.

In the illustrated example, the vehicle 102 includes a controller 112. The controller 112 receives information from systems of the vehicle 102 (e.g., a suspension system, powertrain, engine, etc.) and transmits commands to the suspension system of the vehicle. For example, the controller 112 can transmit a command instructing the suspension system to adjust (e.g., increase or decrease) compression damping of the front and/or rear suspension.

The controller 112 of the illustrated example is communicatively coupled to a sensor or sensors 114 and a vehicle controller area network (CAN) bus 116. In some examples, the sensors 114 include a vehicle speed sensor (e.g., a speedometer) and wheel position sensors (e.g., ride height sensors). In some examples, the sensors 114 include other sensors that obtain data associated with the vehicle 102. The wheel speed sensor determines a speed of the vehicle 102 and outputs speed data to the controller 112 during operation, while the wheel position sensors determine a wheel position (e.g., ride height) of one or more of the wheels 104-110. The vehicle CAN bus 116 obtains vehicle data and/or information from systems of the vehicle 102 (e.g., powertrain, engine, steering system, etc.). In the illustrated example, the controller 112 receives throttle position data from the vehicle CAN bus 116 (e.g., obtained from the powertrain). When the controller 112 receives data from the sensors 114 and the vehicle CAN bus 116, the controller 112 uses the data to determine adjustments to the front and/or rear suspensions of the vehicle 102.

Figure 2:
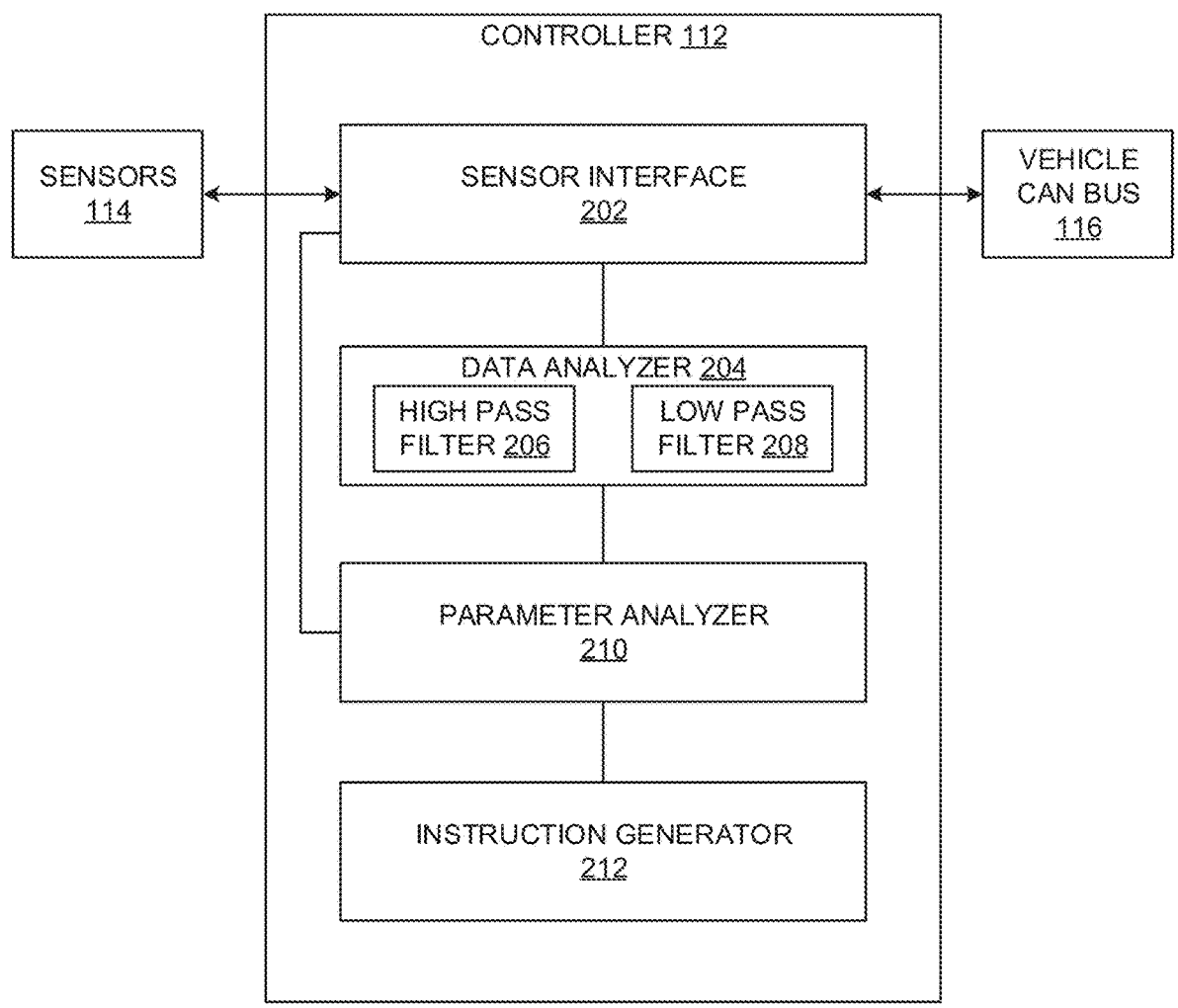
FIG. 2 is a block diagram of the example controller of FIG. 1.

FIG. 2 is a block diagram of the example controller 112 of FIG. 1. The example controller 112 includes an example sensor interface 202, an example data analyzer 204, an example high pass filter 206, an example low pass filter 208, an example parameter analyzer 210, and an example instruction generator 212. In the illustrated example, the sensor interface 202 is communicatively coupled to the sensors 114 and the vehicle controller area network (CAN) bus 116 of FIG. 1. In operation, the sensor interface 202 receives data from the sensors 114, such as vehicle speed data, wheel position data (e.g., ride height for one or more of the wheels 104-110 of FIG. 1), and/or other data associated with a vehicle (e.g., the vehicle 102 of FIG. 1). The sensor interface 202 further receives data from the vehicle CAN bus 116. For example, the vehicle CAN bus 116 can obtain throttle position data from a powertrain of the vehicle 102 and transmit the throttle position data to the sensor interface 202.

The sensor interface 202 is further communicatively coupled to the data analyzer 204. The sensor interface 202 provides the data received from the sensors 114 and/or the vehicle CAN bus 116 to the data analyzer 204. In the illustrated example, the data analyzer 204 receives at least wheel position data, vehicle speed data, and/or throttle position information. The data analyzer 204 determines terrain conditions of a driving surface (e.g., a road, off-road terrain, etc.) based on the wheel position information. In some examples, the wheel position is a measure of how high a wheel is pushed upward into a wheel well. In some examples, the sensor interface 202 receives wheel position data (e.g., ride height) from the left front wheel (e.g., the left front wheel 104 of FIG. 1) and the right front wheel (e.g., the right front wheel 106 of FIG. 1). Additionally or alternatively, the sensor interface 202 receives wheel position data from the left rear wheel (e.g., the left rear wheel 108 of FIG. 1) and/or the right rear wheel (e.g., the right rear wheel 110 of FIG. 1). That is, the sensor interface 202 of the illustrated example can receive wheel position data from the front wheels 104, 106, the rear wheels 108, 110, or both the front and rear wheels 104-110. This wheel position data is analyzed by the data analyzer 204 of the illustrated example to determine the severity of the terrain (e.g., roughness) on which the vehicle 102 is driving.

In some examples, the data analyzer 204 inputs the wheel position data into an example high pass filter 206 to filter out large scale movements of the left front wheel 104 and the right front wheel 106. In some examples, the large scale movements are movements that are not caused by the driving surface on which the vehicle 102 is traveling but are long-term changes in wheel position (e.g., caused by vehicle load, acceleration or deceleration of the vehicle 102, etc.). The high pass filter 206 thus outputs high frequency wheel position data indicative of changes in the driving surface. The high pass filter 206 used by the data analyzer 204 is tunable. For example, the high pass filter 206 can be modified based on vehicle characteristics (e.g., the vehicle type, model of vehicle, suspension type, etc.). Further, in some examples, the high pass filter 206 is tunable based on suspension changes that are a function of vehicle responses, such as vehicle pitch, vehicle roll, and/or other characteristics associated with vehicle handling. In some examples, the high pass filter 206 used by the data analyzer 204 is an exponential moving average high pass filter. That is, the high pass filter 206 filters data within only a subset of the wheel position data so as to focus the analysis on particular data of interest.

The data analyzer 204 determines a magnitude of the changes in terrain (e.g., changes in wheel position) the vehicle 102 is driving on using the filtered wheel position data (e.g., filtered by the high pass filter 206). In some examples, a power spectral density calculation is performed that allows the data analyzer 204 to determine a trend in the severity of the terrain based on the wheel position data. For example, the data analyzer 204 can determine the roughness of the terrain on which the vehicle 102 is driving. The power spectral density calculation used by the data analyzer 204 can thus be used to finetune adjustments to the front and/or rear suspensions of the vehicle 102. In some examples, the data analyzer 204 uses the absolute value of the wheel position data to determine the total magnitude of the changes in the terrain. For example, the data analyzer 204 uses the absolute value of the wheel position data to determine the magnitude of positive and negative changes in wheel position (e.g., as measured from a resting position). The magnitude of the changes in wheel position provides an accurate indication of the roughness of the terrain.

The wheel position data is further processed by the data analyzer 204 using an example low pass filter 208. The low pass filter 208 utilized by the data analyzer 204 determines a rate at which compression damping of a suspension (e.g., suspension of the front wheels 104, 106, suspension of rear wheels 108, 110) is to increase or decrease. For example, when the low pass filter 208 is a fast-response low pass filter, the stiffness (e.g., level of compression damping) of the suspension changes quickly, while a slow response low pass filter ramps in stiffness at a much slower rate. The low pass filter 208 used by the data analyzer 204 is tunable. For example, the low pass filter 208 can be modified based on vehicle characteristics (e.g., vehicle type, model of vehicle, suspension type, etc.). In some examples, the low pass filter 208 used by the data analyzer 204 is an exponential moving average low pass filter. That is, the low pass filter 208 filters data within only a subset of the wheel position data to focus the analysis on particular data of interest. In some examples, the exponential moving average low pass filter calculates a moving average of the wheel position data after the absolute value of the wheel position data has been calculated. In some such examples, the output of the exponential moving average low pass filter is indicative of the severity of the driving surface and/or changes in severity of the driving surface (e.g., a rate at which the road surface becomes rougher or less rough).

In some examples, the data analyzer 204 separately analyzes wheel position data of the front left wheel 104 and the right front wheel 106 (e.g., using the high pass filter, power spectral density, absolute value, low pass filter, etc.). In some examples, the data analyzer 204 determines a maximum wheel position (e.g., related to a maximum compression of the suspension) between the wheel position of the left front wheel 104 and the wheel position of the right front wheel 106. Additionally or alternatively, the data analyzer 204 can determine a maximum wheel position between the wheel position of the left rear wheel 108 and the right rear wheel 110 and/or between the wheel positions of all of the vehicle wheels 104-110. The maximum wheel position is indicative of the condition of the driving surface (e.g., a level of roughness, size of obstacles, etc.). In some examples, the maximum wheel position indicates the roughest possible condition of the driving surface. For example, if the left front wheel 104 has a wheel position that is much larger than the wheel position of the right front wheel 106, the data analyzer 204 will use the larger wheel position (e.g., the wheel position of the left front wheel 104) to determine that the driving surface is rough (e.g., even when the right front wheel 106 indicates the driving surface is relatively smooth). In some alternative examples, the data analyzer 204 uses the wheel position of all of the wheels 104-110 (e.g., instead of determining a maximum wheel position value) to determine adjustments to the front and/or rear suspension.

The data analyzer 204 is further communicatively coupled to the parameter analyzer 210. The data analyzer 204 thus outputs the maximum wheel position (e.g., or other wheel position output) to the parameter analyzer 210. The parameter analyzer 210 is additionally communicatively coupled to the sensor interface 202. The parameter analyzer 210 of the illustrated example thus receives the processed wheel position data (e.g., the maximum wheel position), vehicle speed data, and/or throttle position data. Using the data received from the sensor interface 202 and the data analyzer 204, the parameter analyzer 210 determines several parameters used to determine adjustments to be made to the front and/or rear suspensions of the vehicle 102.

The parameter analyzer 210 uses the vehicle speed to determine a front suspension base current command and/or a rear suspension base current command. The base current commands are current inputs to the suspension (e.g., front and/or rear). In some examples, the base current commands are indicative of a current input to the front and/or rear suspensions at a given vehicle speed if the terrain were smooth (e.g., a road). Additionally or alternatively, other signals (e.g., voltage signals, digital signals, etc.) are used as based commands. Each of the base current commands is determined using a current command table. The current command table uses characteristics of the suspension (e.g., the front and/or rear suspensions), characteristics of the vehicle 102, and the speed of the vehicle 102 to produce potential current inputs to the suspensions that determine a level of compression damping for the suspension. For example, a lower current input to a damper or shock absorber included in the suspension increases compression damping (e.g., stiffness). In some examples, the parameter analyzer 210 determines the base current command from the current command table by extrapolating a current value based on the speed of the vehicle 102. In some examples, each of the front and rear suspensions has a current command table, and a base current command is determined individually for the front and rear suspensions.

The parameter analyzer 210 determines a vehicle response parameter based on the terrain conditions (e.g., determined by the data analyzer 204) and the vehicle speed data. In some examples, the vehicle response parameter is determined by the parameter analyzer 210 using additional information, such as front to rear suspension balance, vehicle speed sensitivity, and/or other characteristics of the vehicle 102. For example, the parameter analyzer 210 can compare the terrain conditions to the front to rear suspension balance and/or the vehicle speed sensitivity to determine the response parameter.

In the illustrated example, the parameter analyzer 210 further uses the throttle position data to determine a throttle response parameter. For example, the parameter analyzer 210 uses the throttle position obtained by the sensor interface 202 and determines a corresponding throttle response parameter (e.g., based on accessing a look-up table, an equation, etc.). In some examples, the throttle response parameter is influenced by factors such as dead zones (e.g., a range of throttle position values that produce no change to the accelerator of the vehicle 102), throttle response rates (e.g., a rate at which a change in throttle position produces a change to the vehicle 102), and/or other throttle characteristics. In some examples, the throttle characteristics vary based on vehicle type, vehicle model, etc. The throttle position is used to modify the amount of compression damping for the suspension because it anticipates driver intent. For example, when the driver decides to increase speed of the vehicle 102, the driver will push down on an accelerator pedal, increasing throttle position. The speed of the vehicle 102 subsequently increases based on the increases in throttle position. Thus, by increasing the compression damping of the suspension based on an increase in throttle position, the amount of compression damping increases prior to or simultaneously with the increase in vehicle speed. In an alternative example, when the driver decreases throttle position, the amount of compression damping decreases in anticipation of the decrease in vehicle speed.

In some examples, the driver of the vehicle knows that the throttle position causes modifications to the compression damping. In some such examples, the driver uses this known response to purposefully increase the compression damping by pushing the accelerator pedal. For example, if the driver sees that the vehicle 102 is approaching rough terrain and desires an increase in compression damping, the driver can push down on the accelerator pedal, increasing throttle position and thereby increasing the amount of compression damping.

When the parameter analyzer 210 determines the front and/or rear suspension base current command, the vehicle response parameter, and the throttle response parameter, the parameter analyzer 210 determines an adjustment to the front suspension and an adjustment to the rear suspension. In some examples, the parameter analyzer 210 can determine an adjustment to one of the suspensions (e.g., the front or the rear suspension). In some examples, the parameter analyzer 210 can determine an adjustment to be applied to both the front and the rear suspensions (e.g., the same current input is used for the front and rear suspensions).

To determine the adjustments, the parameter analyzer 210 combines the parameters for each of the front and rear suspensions. For example, the parameter analyzer 210 combines the front suspension base current command, the vehicle response parameter, and the throttle response parameter for the front suspension and, for the rear suspension, combines the rear suspension base current command, the vehicle response parameter, and the throttle response parameter. In some examples, the parameter analyzer 210 combines the parameters by multiplying the parameters. In some alternative examples, the parameters are combined by other processes (e.g., summation).

For the front suspension adjustment, the parameter analyzer 210 compares the combined parameters (e.g., the parameters associated with the front suspension) and the front suspension base current command. The parameter analyzer 210 selects the minimum between these two values to be the current input to the front suspension. The compression damping is increased when the current input is decreased and, thus, the minimum of the two aforementioned values (e.g., the combined parameters and the front suspension base current command) represents the larger amount of compression damping. The rear suspension adjustment is determined in a similar manner. The parameter analyzer 210 determines the minimum between the combined parameters (e.g., the combined parameters associated with the rear suspension) and the rear suspension base current command. This current command is then used as a current input to the dampers and/or shock absorbers associated with the rear suspension.

The minimum parameters determined by the parameter analyzer 210 for the front and rear suspensions are then used by the instruction generator 212 to provide instructions to the respective suspensions. For example, the instruction generator 212 transmits instructions to the front and rear suspensions regarding a modification to the current input to the dampers and/or shock absorbers of the respective suspensions. In some examples, the current input to the dampers is decreased (e.g., increasing the compression damping) based on the instructions provided by the instruction generator 212. In some alternative examples, the current input to the dampers increases (e.g., decreasing the compression damping) based on the instructions. The controller 112 can continue to adjust the compression damping of either the front or rear suspension while the vehicle 102 is in operation.

While an example manner of implementing the example controller 112 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor interface 202, the example data analyzer 204, the example high pass filter 206, the example low pass filter 208, the example parameter analyzer 210, the example instruction generator 212, and/or, more generally, the example controller 112 of FIG. 2 may be implemented by hardware, software, firmware and/or any combination of hardware, software and/or firmware. Thus, for example, any of the example sensor interface 202, the example data analyzer 204, the example high pass filter 206, the example low pass filter 208, the example parameter analyzer 210, the example instruction generator 212, and/or, more generally, the example controller 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example data analyzer 204, the example high pass filter 206, the example low pass filter 208, the example parameter analyzer 210, the example instruction generator 212, and/or the example controller 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 112 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the controller 112 of FIGS. 1 and/or 2 are shown in FIGS. 3-6. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example programs are described with reference to the flowcharts illustrated in FIGS. 3-5, many other methods of implementing the example controller 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 3:
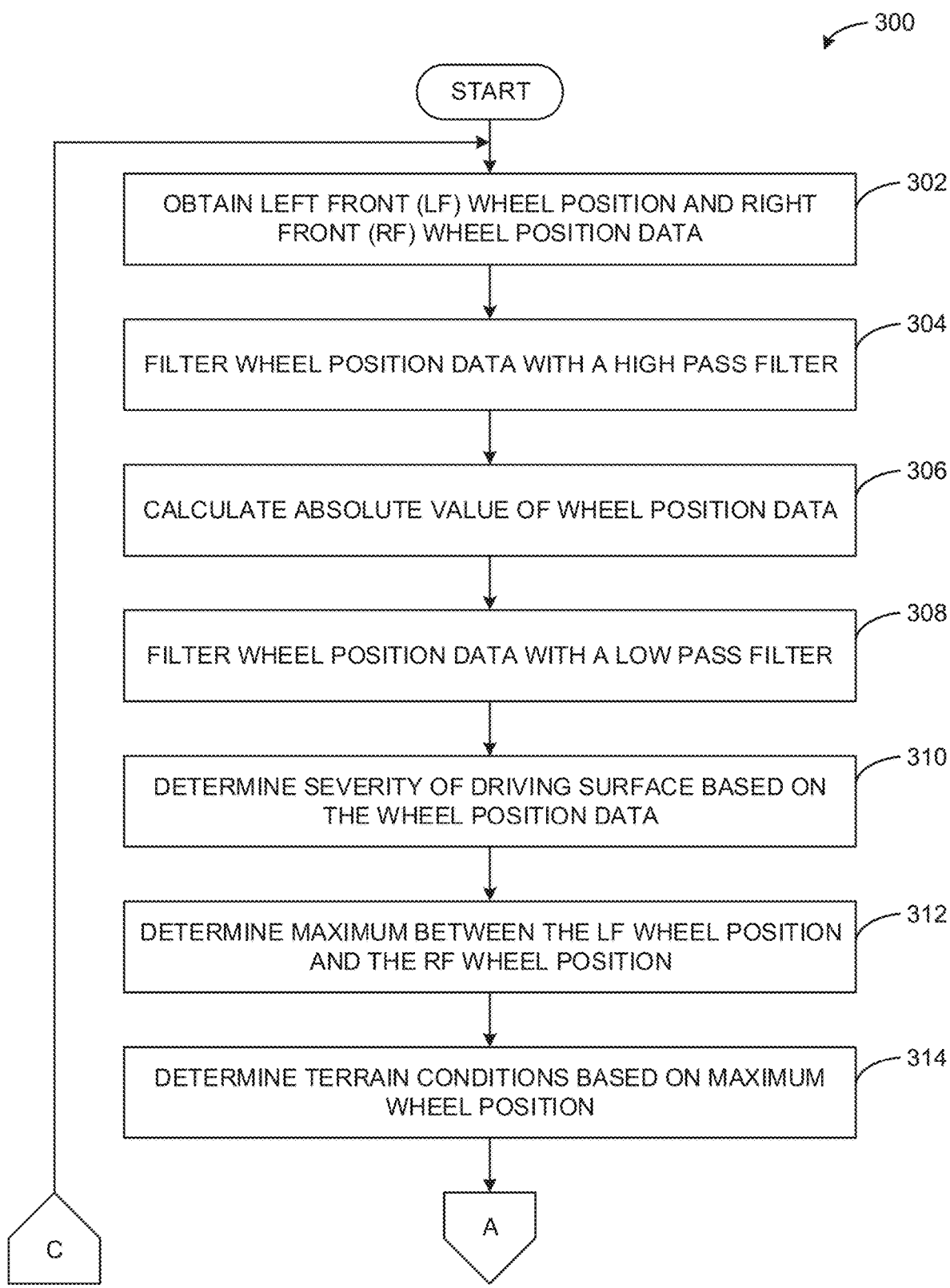
FIG. 3 is a flowchart representative of machine readable instructions that may be executed to implement the example controller of FIGS. 1 and/or 2 to determine terrain conditions of a driving surface.

FIG. 3 is a flowchart representative of machine readable instructions that may be executed to implement the example controller of FIGS. 1 and/or 2 to determine terrain conditions of a driving surface. The example program 300 begins at block 302 where the example controller 112 obtains a left front wheel position and right front wheel position data. For example, a wheel sensor can determine a ride height for each of the front wheels (e.g., the left and right front wheels 104, 106 of FIG. 1) of a vehicle (e.g., the vehicle 102 of FIG. 1) and transmit the data to the example sensor interface 202 of FIG. 2. In some examples, the sensor interface 202 receives a constant flow of wheel position data for the left front and/or right front wheels. Additionally or alternatively, the controller 112 can receive rear wheel (e.g., the left and/or right rear wheels 108, 110 of FIG. 1) position data. In some examples, the controller 112 executes the instructions of FIGS. 3-5 utilizing front wheel position data, rear wheel position data, and/or both front and rear wheel position data.

At block 304, the controller 112 filters the wheel position data with a high pass filter. For example, the wheel position data from the left front and right front wheels can be filtered by a high pass filter (e.g., the high pass filter 206 of FIG. 2) to identify and remove large scale movements of the left front wheel 104 and/or the right front wheel 106 (e.g., movements that are not excited by the terrain itself). In some examples, the large scale movements are long-term changes in wheel position data (e.g., caused by vehicle load, acceleration or deceleration of the vehicle 102, etc.). The high pass filter 206 outputs high frequency wheel position data indicative of changes caused by the driving surface of the vehicle 102. In some examples, the high pass filter 206 is tunable based on characteristics of a vehicle (e.g., the vehicle 102 of FIG. 1), such that each vehicle 102 filters out specific wheel position data to optimize performance of the program 300. In some such examples, the high pass filter 206 is tunable based on suspension changes that are a function of vehicle responses such as vehicle pitch, vehicle roll, and/or other characteristics associated with vehicle handling. In some examples, the high pass filter 206 is an exponential moving average high pass filter. An exponential moving average high pass filter is utilized in some examples because it allows the high pass filter to focus on a subset of the wheel position data (e.g., instead of the entire set of the wheel position data). In some examples, the left front wheel position data and the right front wheel position data are filtered independently of one another.

The controller 112 further calculates an absolute value of the wheel position data (block 306). For example, the data analyzer 204 takes an absolute value of the wheel position data output by the high pass filter 206 to determine a total change in wheel position. In such examples, taking the absolute value of a negative wheel positions (e.g., when a wheel moves below a resting position) allows the average wheel position (e.g., calculated by the low pass filter 208 of FIG. 2) to be accurate (e.g., by preventing positive and negative changes in wheel position to nullify one another).

At block 308, the controller 112 filters the wheel position data with a low pass filter (e.g., the low pass filter 208 of FIG. 2). For example, the data output at block 306 can serve as an input into an exponential moving average low pass filter operated by the data analyzer 204. An exponential moving average low pass filter is utilized in some examples because it allows the low pass filter 208 to focus on a subset of the wheel position data (e.g., instead of the entire set of the wheel position data). For example, the exponential moving average low pass filter calculates a moving average of the wheel position data after the absolute value has been calculated (e.g., at block 306). In some examples, the low pass filter 208 used at block 308 determines how quickly the vehicle 102 ramps in and ramps out (e.g., adds or subtracts) compression damping (e.g. stiffness). For example, a fast-response low pass filter will quickly adjust stiffness of the suspension, while a slow-response low pass filter will adjust the stiffness more gradually. In some examples, the left front wheel position data and the right front wheel position data are filtered independently by the exponential moving average low pass filter.

The controller 112 then determines a severity of a driving surface based on the wheel position data (block 310). For example, the output from the low pass filter 208 is indicative of a severity of input into the vehicle 102 (e.g., severity of the roughness of the road surface) over time to determine a trend in the wheel position data. For example, the output from the low pass filter 208 indicates a rate at which a road surface becomes rougher and/or a rate at which the roughness of the road surface decreases. Such trends in the data can be useful, for example, in determining the severity of current and future terrain.

The controller 112 further determines a maximum between the left front wheel position and the right front wheel position (block 312). For example, the data analyzer 204 determines whether the right front wheel position value or the left front wheel position value is larger once the wheel position data has been filtered by the low pass filter 208 (e.g., at block 308). The maximum position is indicative of the roughest possible terrain conditions that could be present. For example, if the right front wheel 106 is on a smooth driving surface (e.g., a road) and the left front wheel 104 is on a rough surface (e.g., a shoulder of a road), the controller 112 will accommodate for the roughest possible driving surface (e.g., the shoulder of the road).

At block 314, the controller 112 determines terrain conditions based on the maximum wheel position. For example, a large maximum wheel position (e.g., of the right or left front wheel 104, 106) indicate large obstacles and/or rougher road surface, while smaller maximum wheel positions indicate relatively smooth driving surfaces. When the terrain conditions have been determined, the program 300 provides input into block 408 of program 400 of FIG. 4 (e.g., denoted by the "A" in FIG. 4) and concludes.

Figure 4:
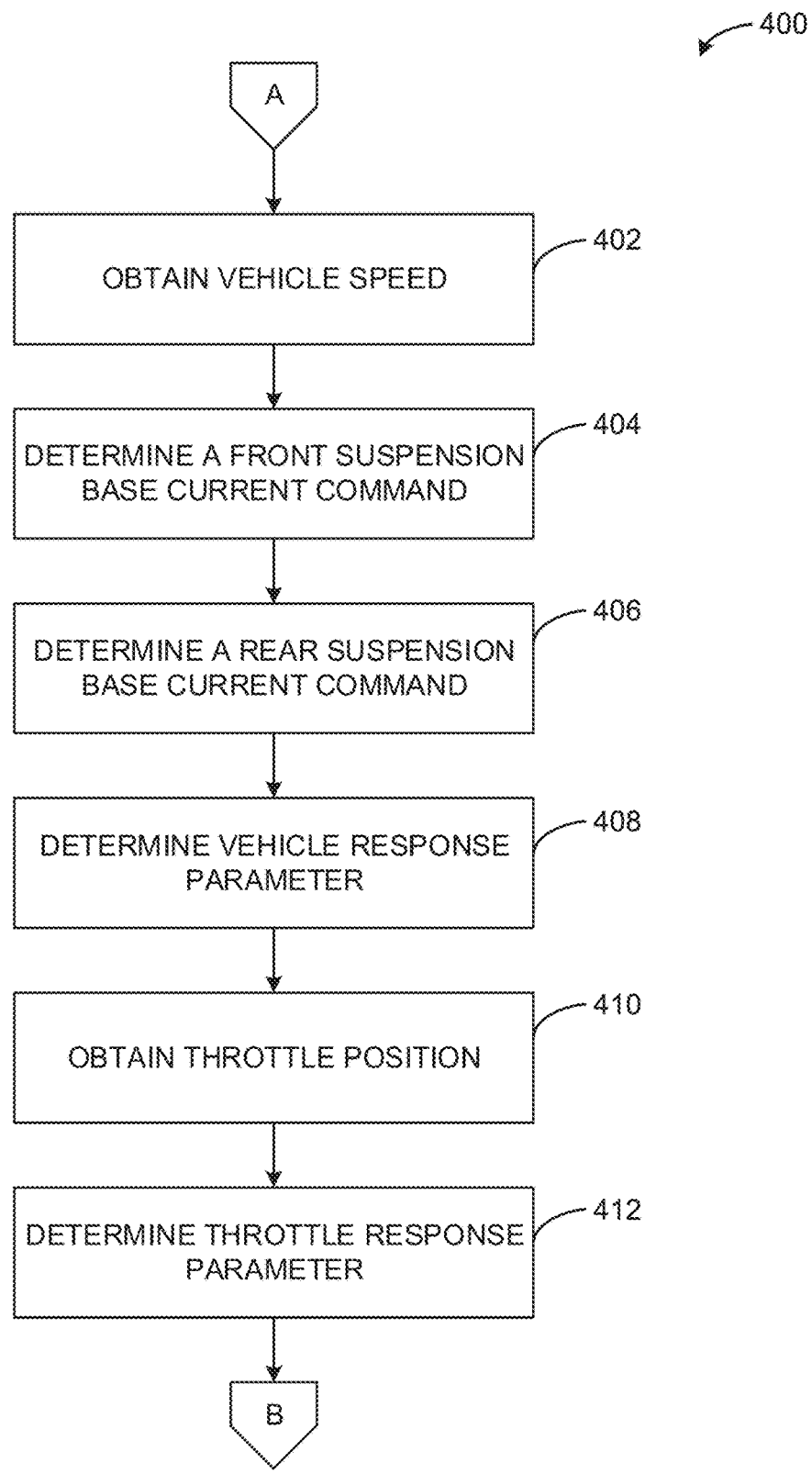
FIG. 4 is a flowchart representative of machine readable instructions that may be executed to implement the example controller of FIGS. 1 and/or 2 to determine suspension adjustment parameters based on vehicle speed and throttle position.

FIG. 4 is a flowchart representative of machine readable instructions that may be executed to implement the example controller of FIGS. 1 and/or 2 to determine suspension adjustment parameters based on vehicle speed and throttle position. The example program 400 begins at block 402 where the controller 112 obtains vehicle speed. For example, the sensor interface 202 of FIG. 2 can receive vehicle speed data from a speedometer of the vehicle 102 of FIG. 1.

At block 404, the controller 112 determines a front suspension base current command. For example, the parameter analyzer 210 can receive the vehicle speed (e.g., from block 402) and access a current command table that includes corresponding front suspension base current commands associated with the front suspension. In some examples, the command table includes base current commands based on characteristics of the vehicle 102 (e.g., vehicle make and model) and the current speed of the vehicle 102. In some examples, the front suspension base current command is further dependent on characteristics of the front suspension (e.g., suspension type, spring rate, etc.).

At block 406, the controller 112 determines a rear suspension base current command. For example, the parameter analyzer 210 can receive the vehicle speed (e.g., from block 402) and access a current command table that includes corresponding rear suspension base current commands associated with the rear suspension. In some examples, the command table includes base current commands based on vehicle characteristics (e.g., make and model of the vehicle 102) and the current speed of the vehicle 102 (e.g., obtained in block 402). In some examples, the rear suspension base current command is further dependent on characteristics of the rear suspension (e.g., suspension type, spring rate, etc.). In some examples, the front and rear suspension base current commands are determined for the front and rear suspensions simultaneously. Alternatively, the front and rear suspension base current commands are determined for the front and rear suspensions consecutively, independently, and/or in any other order.

The controller 112 then determines a vehicle response parameter (block 408). For example, the vehicle speed data from block 402 and the terrain conditions determined at block 312 of FIG. 3 can be used to determine the value of the vehicle response parameter. In some examples, the vehicle response parameter is further based on vehicle characteristics of the vehicle 102. In some such examples, the vehicle characteristics include front to rear suspension balance, vehicle speed sensitivity, and/or other parameters specific to the vehicle 102 and/or the current operation of the vehicle 102. The vehicle response parameter is indicative of how much the compression damping should be adjusted based on the terrain conditions of the driving surface. In some examples, the controller 112 executes blocks 404, 406, and/or 408 in any order. For example, the controller 112 can execute block 404 before or after execution of block 406 and/or block 408, or can execute blocks 404, 406, and 408 simultaneously.

At block 410, the controller 112 obtains throttle position. For example, the vehicle CAN bus 116 of FIGS. 1 and/or 2 can transmit throttle position data (e.g., collected by the powertrain) to the sensor interface 202 of FIG. 2.

At block 412, the controller 112 determines a throttle response parameter. For example, the parameter analyzer 210 uses the throttle position obtained at block 410 and determines a corresponding throttle response parameter (e.g., based on accessing a look-up table). In some examples, the throttle response parameter is based on throttle characteristics such as throttle dead zones, throttle response rates, and/or other throttle characteristics. When the throttle response parameter has been determined, the program 400 concludes, and the output of program 400 (e.g., the vehicle response parameter and/or the throttle response parameter) is used in program 500, as discussed in further detail in connection with FIG. 5.

Figure 5:
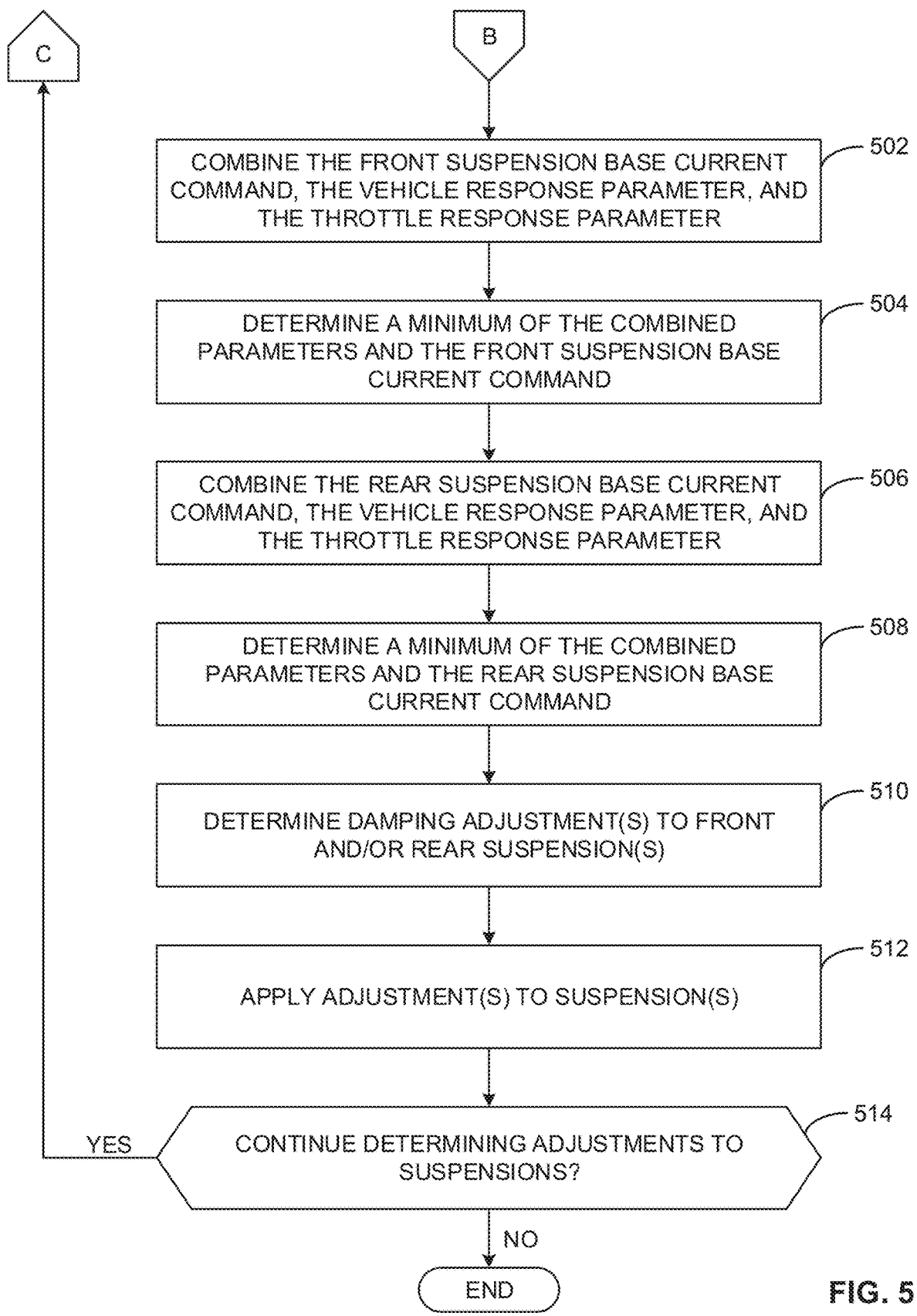
FIG. 5 is a flowchart representative of machine readable instructions that may be executed to implement the example controller of FIGS. 1 and/or 2 to apply an adjustment to a suspension of a vehicle.

FIG. 5 is a flowchart representative of machine readable instructions that may be executed to implement the example controller of FIGS. 1 and/or 2 to apply an adjustment to a suspension of a vehicle. The example program 500 begins at block 502 where the controller 112 combines the front suspension base current command, the vehicle response parameter, and the throttle response parameter. For example, the parameter analyzer 210 can calculate a product of the front suspension base current command, the vehicle response parameter, and/or the throttle response parameter. In some alternative examples, the controller 112 sums the front suspension base current command, the vehicle response parameter, and/or the throttle response parameter.

The controller 112 further determines a minimum of the combined parameters and the front suspension base current command (block 504). For example, the parameter analyzer 210 selects the minimum current command value (e.g., the minimum of the current command produced by the combined parameters and the front suspension base current command) that provides the highest compression damping to the front suspension (e.g., the lower the current command, the higher the compression damping of the front suspension).

At block 506, the controller 112 combines the rear suspension base current command, the vehicle response parameter, and the throttle response parameter. For example, the parameter analyzer 210 can calculate a product of the rear suspension base current command, the vehicle response parameter, and/or the throttle response parameter. In some alternative examples, the parameter analyzer 210 sums the vehicle response parameter, the rear suspension speed-based parameter, and/or the throttle response parameter.

The controller 112 further determines a minimum of the combined parameters and the rear suspension base current command (block 508). For example, the parameter analyzer 210 selects the minimum current command value (e.g., the minimum of the current command produced by the combined parameters and the rear suspension base current command) that will provide the highest compression damping to the rear suspension (e.g., the lower the current command, the higher the compression damping of the rear suspension).

At block 510, the controller 112 determines a damping adjustment to front and/or rear suspensions. For example, the instruction generator 212 of FIG. 2 can determine the damping adjustments based on the current commands determined in blocks 504 and 508. In some examples, the instruction generator 212 determines that an amount of compression damping at the front and/or rear suspension should be increased or decreased based on the minimum between the combined parameters and the base current command for the respective front and/or rear suspensions.

The controller 112 further applies the adjustments to the suspensions (block 512). For example, the compression damping adjustments determined in block 510 are applied to the respective suspensions (e.g., the front and/or rear suspensions) via the current command. The current input to the dampers and/or shock absorbers of the front and/or rear suspensions are adjusted, increasing or decreasing the stiffness and corresponding compression damping.

At block 514, the controller 112 determines whether to continue determining adjustments to the suspensions. When the controller 112 determines that the controller 112 is to continue determining adjustments to the suspensions, the controller 112 returns to block 302 of program 300, where left front and right front wheel position data is obtained. When the controller 112 determines that no more adjustments are to be made to the suspensions, control of program 500 concludes.

Figure 6:
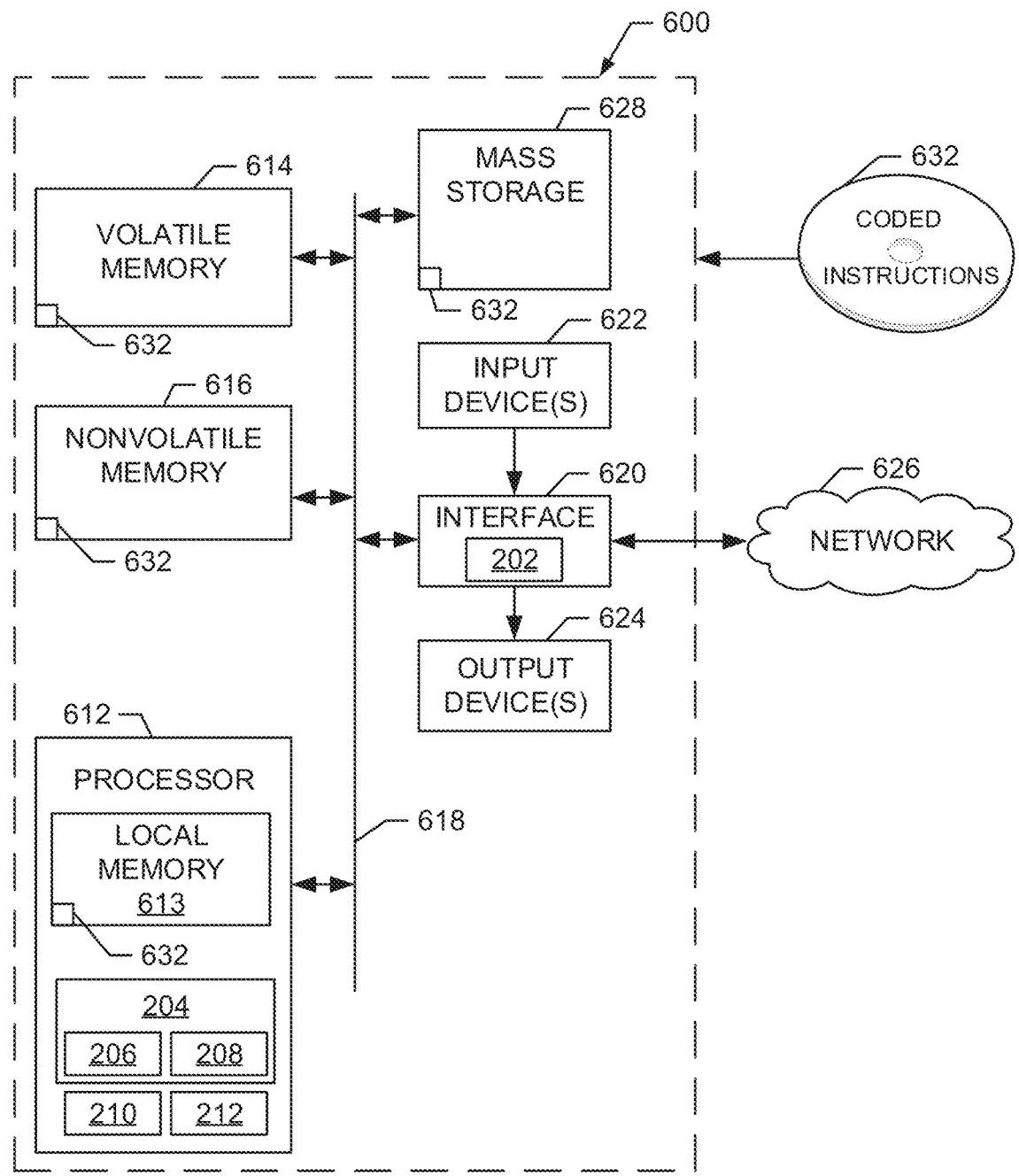
FIG. 6 is a block diagram of an example processing platform structured to execute the instructions of FIGS. 3-5 to implement the example controller of FIGS. 1 and/or 2.

FIG. 6 is a block diagram of an example processor platform 600 structured to execute the instructions of FIGS. 3-5 to implement the controller 112 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data analyzer 204, the example high pass filter 206, the example low pass filter 208, the example parameter analyzer 210, and the example instruction generator 212.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. In this example, the interface circuit 620 implements the sensor interface 202 of FIG. 2. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3-5 may be stored in the mass storage device 628, in the volatile memory 614, in the non-volatile memory 616, and/or on a removable non-transitory computer readable storage medium such as a CD or DVD.

From the foregoing, it will be appreciated that example methods and apparatus have been disclosed that adjust vehicle suspension damping (e.g., compression damping). The examples disclosed herein determine the terrain conditions based on wheel position of a wheel or wheels of the vehicle. In some examples, adjustments are made to the suspensions based on the terrain conditions and the speed of the vehicle. Further, the examples disclosed herein advantageously use throttle position to adjust the level of damping, effectively anticipating the actions of the driver (e.g., changes in throttle position indicate intent of the driver to increase or decrease vehicle speed). These adjustments to the damping of the suspension increase driver control of the vehicle and improve driver comfort on rough terrain. The examples disclosed herein additionally maintain comfort and control on smooth terrain, regardless of vehicle speed.

The adjustments made to the suspension damping (e.g., compression damping) based on throttle position can be used advantageously by a driver. For example, if the driver desires to increase compression damping (e.g., when approaching rough terrain), the driver can increase the throttle position. Because the driver knows the effect of pushing the throttle (e.g., increasing compression damping), the driver can intentionally increase the compression damping to protect the vehicle (e.g., by driving over large obstacles or experiencing high impacts with the correct level of compression damping).

Example 1 includes an apparatus comprising a sensor interface to obtain wheel position information and vehicle speed information from sensors associated with wheels of a vehicle obtain throttle position information, a parameter analyzer to determine a compression damping command based on the wheel position information, the vehicle speed information and the throttle position information, and an instruction generator to adjust a damping system of the vehicle based on the compression damping command.

Example 2 includes the apparatus of example 1, wherein the parameter analyzer is further to determine a vehicle response parameter based on vehicle characteristics and the vehicle speed information.

Example 3 includes the apparatus of example 2, wherein the vehicle characteristics include at least front and rear vehicle balance or vehicle speed sensitivity.

Example 4 includes the apparatus of example 2, wherein the parameter analyzer is further to determine a throttle response parameter based on the throttle position information and throttle characteristics.

Example 5 includes the apparatus of example 4, wherein the throttle characteristics include at least a dead zone determination or a throttle response rate.

Example 6 includes the apparatus of example 4, wherein the parameter analyzer is further to determine a base current command based on the vehicle speed information and a suspension command table.

Example 7 includes the apparatus of example 6, wherein the parameter analyzer is further to determine the compression damping command based on the throttle response parameter, the vehicle response parameter, and the base current command.

Example 8 includes a tangible computer readable storage medium comprising instructions that, when executed, cause a machine to at least obtain wheel position information and vehicle speed information from sensors associated with wheels of a vehicle and obtain throttle position information, determine a compression damping command based on the wheel position information, the vehicle speed information and the throttle position information, and adjust a damping system of the vehicle based on the compression damping command.

Example 9 includes the tangible computer readable storage medium of example 8, wherein the instructions, when executed, further cause the machine to determine a vehicle response parameter based on vehicle characteristics and the vehicle speed information.

Example 10 includes the tangible computer readable storage medium of example

Example 11 includes the tangible computer readable storage medium of example 9, wherein the instructions, when executed, further cause the machine to determine a vehicle response parameter based on vehicle characteristics and the vehicle speed information.

Example 12 includes the tangible computer readable storage medium of example 11, wherein the throttle characteristics include at least a dead zone determination or a throttle response rate.

Example 13 includes the tangible computer readable storage medium of example 11, wherein the instructions, when executed, further cause the machine to determine a base current command based on the vehicle speed information and a suspension command table.

Example 14 includes the tangible computer readable storage medium of example 13, wherein the instructions, when executed, further cause the machine to determine the compression damping command based on the throttle response parameter, the vehicle response parameter, and the base current command.

Example 15 includes a method comprising obtaining wheel position information and vehicle speed information from sensors associated with wheels of a vehicle, obtaining throttle position information, determining a compression damping command based on the wheel position information, the vehicle speed information and the throttle position information, and adjusting a damping system of the vehicle based on the compression damping command.

Example 16 includes the method of example 15, further including determining a vehicle response parameter based on vehicle characteristics and the vehicle speed information.

Example 17 includes the method of example 16, further including determining a vehicle response parameter based on vehicle characteristics and the vehicle speed information.

Example 18 includes the method of example 16, wherein the vehicle characteristics include at least front and rear vehicle balance or vehicle speed sensitivity.

Example 19 includes the method of example 18, further including determining a throttle response parameter based on the throttle position information and throttle characteristics.

Example 20 includes the method of example 19, further including determining the compression damping command based on the throttle response parameter, the vehicle response parameter, and the base current command.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a sensor interface configured to:
      obtain wheel position information and vehicle speed information from sensors associated with wheels of a vehicle, the wheel position information including first wheel position data and second wheel position data; and
      obtain throttle position information;
   a data analyzer configured to determine a terrain condition based on a greater of the first wheel position data and the second wheel position data;
   a parameter analyzer configured to determine a compression damping command based on the terrain condition, the vehicle speed information and the throttle position information; and
   an instruction generator configured to adjust a damping system of the vehicle based on the compression damping command.

2. The apparatus of claim 1, wherein the parameter analyzer is further configured to determine a vehicle response parameter based on vehicle characteristics and the vehicle speed information.

3. The apparatus of claim 2, wherein the vehicle characteristics include at least front and rear vehicle balance or vehicle speed sensitivity.

4. The apparatus of claim 2, wherein the parameter analyzer is further configured to determine a throttle response parameter based on the throttle position information and throttle characteristics.

5. The apparatus of claim 4, wherein the throttle characteristics include at least a dead zone determination or a throttle response rate.

6. The apparatus of claim 4, wherein the parameter analyzer is further configured to determine a base current command based on the vehicle speed information and a suspension command table.

7. The apparatus of claim 6, wherein the parameter analyzer is further configured to determine the compression damping command based on the throttle response parameter, the vehicle response parameter, and the base current command.

8. A tangible computer readable storage medium comprising instructions that, when executed, cause a machine to at least:
   obtain wheel position information and vehicle speed information from sensors associated with wheels of a vehicle, the wheel position information including first wheel position data and second wheel position data;
   obtain throttle position information;

determine a terrain condition based on a greater of the first wheel position data and the second wheel position data;

determine a compression damping command based on the terrain condition, the vehicle speed information and the throttle position information; and adjust a damping system of the vehicle based on the compression damping command.

9. The tangible computer readable storage medium of claim 8, wherein the instructions, when executed, further cause the machine to determine a vehicle response parameter based on vehicle characteristics and the vehicle speed information.

10. The tangible computer readable storage medium of claim 9, wherein the vehicle characteristics include at least front and rear vehicle balance or vehicle speed sensitivity.

11. The tangible computer readable storage medium of claim 9, wherein the instructions, when executed, further cause the machine to determine a throttle response parameter based on the throttle position information and throttle characteristics.

12. The tangible computer readable storage medium of claim 11, wherein the throttle characteristics include at least a dead zone determination or a throttle response rate.

13. The tangible computer readable storage medium of claim 11, wherein the instructions, when executed, further cause the machine to determine a base current command based on the vehicle speed information and a suspension command table.

14. The tangible computer readable storage medium of claim 13, wherein the instructions, when executed, further cause the machine to determine the compression damping command based on the throttle response parameter, the vehicle response parameter, and the base current command.

15. A method comprising:
obtaining wheel position information and vehicle speed information from sensors associated with wheels of a vehicle, the wheel position information including first wheel position data and second wheel position data;

obtaining throttle position information;

determining a terrain condition based a greater of the first wheel position data and the second wheel position data;

determining a compression damping command based on the terrain condition, the vehicle speed information and the throttle position information; and adjusting a damping system of the vehicle based on the compression damping command.

16. The method of claim 15, further including determining a vehicle response parameter based on vehicle characteristics and the vehicle speed information.

17. The method of claim 16, wherein the vehicle characteristics include at least front and rear vehicle balance or vehicle speed sensitivity.

18. The method of claim 16, further including determining a throttle response parameter based on the throttle position information and throttle characteristics.

19. The method of claim 18, further including determining a base current command based on the vehicle speed information and a suspension command table.

20. The method of claim 19, further including determining the compression damping command based on the throttle response parameter, the vehicle response parameter, and the base current command.

* * * * *